US011514493B1

(12) United States Patent
Cook et al.

(10) Patent No.: US 11,514,493 B1
(45) Date of Patent: Nov. 29, 2022

(54) SYSTEM AND METHOD FOR CONVERSATIONAL COMMERCE ONLINE

(71) Applicant: Overstock.com, Inc., Midvale, UT (US)

(72) Inventors: Tyler Forbes Cook, Highland, UT (US); Mindi Hamilton-Novasio, Cottonwood Heights, UT (US)

(73) Assignee: Overstock.com, Inc., Midvale, UT (US)

( * ) Notice: Subject to any disclaimer, the term of this patent is extended or adjusted under 35 U.S.C. 154(b) by 2 days.

(21) Appl. No.: 16/830,000

(22) Filed: Mar. 25, 2020

Related U.S. Application Data

(60) Provisional application No. 62/823,453, filed on Mar. 25, 2019.

(51) Int. Cl.
*G06Q 30/00* (2012.01)
*G06Q 30/06* (2012.01)
(Continued)

(52) U.S. Cl.
CPC ......... *G06Q 30/0617* (2013.01); *G06F 21/32* (2013.01); *G06F 40/56* (2020.01);
(Continued)

(58) Field of Classification Search
CPC ........... G06Q 30/0617; G06Q 30/0281; G06Q 30/0631; G06Q 30/0641; G06F 40/56; G06F 21/32; G06N 20/00
(Continued)

(56) References Cited

U.S. PATENT DOCUMENTS

| | | | |
|---|---|---|---|
| 3,573,747 | A | 4/1971 | Adams et al. |
| 3,581,072 | A | 5/1971 | Nymeyer |

(Continued)

FOREIGN PATENT DOCUMENTS

| | | |
|---|---|---|
| CA | 2253543 | 3/1997 |
| CA | 2347812 | 5/2000 |

(Continued)

OTHER PUBLICATIONS

"The Future of Shopping." Harrington, Caitlin. Wired 26.12: 30. Condé Nast Publications, Inc. (Dec. 2018); Dialog #2135665936 4pgs.*

(Continued)

*Primary Examiner* — Robert M Pond
(74) *Attorney, Agent, or Firm* — Clayton Howarth, P.C.

(57) ABSTRACT

This disclosure relates generally to a system and method for creating computer-generated conversational commerce. A conversational AI interacts with a human being and guides that human being through a virtual interaction while communicating and humanizing the interaction. A user makes a request, whether through voice or through typing at the computer, and the system interprets that request while making additional, natural communications with the user, such as suggesting additional items, asking additional questions to gain more information when needed, and learning from interactions. The AI simulates a human being on the website, responding to the user, and asks for additional information, as if a user were actually at a brick-and-mortar store interacting with a salesperson.

18 Claims, 4 Drawing Sheets

(51) Int. Cl.
*G06Q 30/02* (2012.01)
*G06F 21/32* (2013.01)
*G06F 40/56* (2020.01)
*G06N 20/00* (2019.01)

(52) U.S. Cl.
CPC ..... *G06Q 30/0281* (2013.01); *G06Q 30/0631* (2013.01); *G06Q 30/0641* (2013.01); *G06N 20/00* (2019.01)

(58) Field of Classification Search
USPC .......................................... 705/26, 27, 4, 2
See application file for complete search history.

(56) References Cited

U.S. PATENT DOCUMENTS 4,412,287 A 10/1983 Braddock, III
4,674,044 A 6/1987 Kalmus et al.
4,677,552 A 6/1987 Sibley, Jr.
4,789,928 A 12/1988 Fujisaki
4,799,156 A 1/1989 Shavit et al.
4,808,987 A 2/1989 Takeda et al.
4,823,265 A 4/1989 Nelson
4,854,516 A 8/1989 Yamada
4,903,201 A 2/1990 Wagner
RE33,316 E 8/1990 Katsuta et al.
5,027,110 A 6/1991 Chang et al.
5,053,956 A 10/1991 Donald et al.
5,063,507 A 11/1991 Lindsey et al.
5,077,665 A 12/1991 Silverman et al.
5,101,353 A 3/1992 Lupien et al.
5,136,501 A 8/1992 Silverman et al.
5,168,446 A 12/1992 Wiseman
5,205,200 A 4/1993 Wright
5,243,515 A 9/1993 Lee
5,258,908 A 11/1993 Hartheimer et al.
5,280,422 A 1/1994 Moe et al.
5,297,031 A 3/1994 Gutterman et al.
5,297,032 A 3/1994 Trojan et al.
5,301,350 A 4/1994 Rogan et al.
5,305,200 A 4/1994 Hartheimer et al.
5,325,297 A 6/1994 Bird et al.
5,329,589 A 7/1994 Fraser et al.
5,347,632 A 9/1994 Filepp et al.
5,375,055 A 12/1994 Togher et al.
5,377,354 A 12/1994 Scannell et al.
5,394,324 A 2/1995 Clearwater
5,407,433 A 4/1995 Loomas
5,411,483 A 5/1995 Loomas et al.
5,426,281 A 6/1995 Abecassis
5,485,510 A 1/1996 Colbert
5,493,677 A 2/1996 Balogh et al.
5,553,145 A 9/1996 Micali
5,557,728 A 9/1996 Garrett et al.
5,579,471 A 11/1996 Barber et al.
5,596,994 A 1/1997 Bro
5,598,557 A 1/1997 Doner et al.
5,621,790 A 4/1997 Grossman et al.
5,640,569 A 6/1997 Miller et al.
5,657,389 A 8/1997 Houvener
5,664,111 A 9/1997 Nahan et al.
5,664,115 A 9/1997 Fraser
5,689,652 A 11/1997 Lupien et al.
5,694,546 A 12/1997 Reisman
5,706,457 A 1/1998 Dwyer et al.
5,710,889 A 1/1998 Clark et al.
5,715,314 A 2/1998 Payne et al.
5,715,402 A 2/1998 Popolo
5,717,989 A 2/1998 Tozzoli et al.
5,721,908 A 2/1998 Lagarde et al.
5,722,418 A 3/1998 Bro
5,727,165 A 3/1998 Ordish et al.
5,737,599 A 4/1998 Rowe et al.
5,760,917 A 6/1998 Sheridan
5,761,496 A 6/1998 Hattori
5,761,655 A 6/1998 Hoffman
5,761,662 A 6/1998 Dasan
5,771,291 A 6/1998 Newton et al.
5,771,380 A 6/1998 Tanaka et al.
5,778,367 A 7/1998 Wesinger, Jr. et al.
5,790,790 A 8/1998 Smith et al.
5,794,216 A 8/1998 Brown
5,794,219 A 8/1998 Brown
5,796,395 A 8/1998 de Hond
5,799,285 A 8/1998 Klingman
5,803,500 A 9/1998 Mossberg
5,818,914 A 10/1998 Fujisaki
5,826,244 A 10/1998 Huberman
5,835,896 A 11/1998 Fisher et al.
5,845,265 A 12/1998 Woolston
5,845,266 A 12/1998 Lupien et al.
5,850,442 A 12/1998 Muftic
5,870,754 A 2/1999 Dimitrova et al.
5,872,848 A 2/1999 Romney et al.
5,873,069 A 2/1999 Reuhl et al.
5,873,080 A 2/1999 Coden et al.
5,884,056 A 3/1999 Steele
5,890,138 A 3/1999 Godin et al.
5,890,175 A 3/1999 Wong et al.
5,905,975 A 5/1999 Ausubel
5,907,547 A 5/1999 Foladare et al.
5,913,215 A 6/1999 Rubinstein et al.
5,922,074 A 7/1999 Richard et al.
5,924,072 A 7/1999 Havens
5,926,794 A 7/1999 Fethe
5,948,040 A 9/1999 DeLorme et al.
5,948,061 A 9/1999 Merriman et al.
5,970,490 A 10/1999 Morgenstern
5,974,396 A 10/1999 Anderson et al.
5,974,412 A 10/1999 Hazlehurst et al.
5,986,662 A 11/1999 Argiro et al.
5,987,446 A 11/1999 Corey et al.
5,991,739 A 11/1999 Cupps et al.
5,999,915 A 12/1999 Nahan et al.
6,012,053 A 1/2000 Pant et al.
6,029,141 A 2/2000 Bezos et al.
6,035,288 A 3/2000 Solomon
6,035,402 A 3/2000 Vaeth et al.
6,044,363 A 3/2000 Mori et al.
6,045,447 A 4/2000 Yoshizawa et al.
6,047,264 A 4/2000 Fisher et al.
6,049,797 A 4/2000 Guha et al.
6,055,518 A 4/2000 Franklin et al.
6,058,379 A 5/2000 Odom et al.
6,058,417 A 5/2000 Hess et al.
6,058,428 A 5/2000 Wang et al.
6,061,448 A 5/2000 Smith et al.
6,065,041 A 5/2000 Lum et al.
6,070,125 A 5/2000 Murphy et al.
6,073,117 A 6/2000 Oyanagi et al.
6,078,914 A 6/2000 Redfern
6,085,176 A 7/2000 Woolston
6,104,815 A 8/2000 Alcorn et al.
6,119,137 A 9/2000 Smith et al.
6,128,649 A 10/2000 Smith et al.
6,141,010 A 10/2000 Hoyle
6,167,382 A 12/2000 Sparks et al.
6,178,408 B1 1/2001 Coppie et al.
6,185,558 B1 2/2001 Bowman et al.
6,192,407 B1 2/2001 Smith et al.
6,199,077 B1 3/2001 Inala et al.
6,202,051 B1 3/2001 Woolston
6,202,061 B1 3/2001 Khosla et al.
6,226,412 B1 5/2001 Schwab
6,243,691 B1 6/2001 Fisher et al.
6,269,238 B1 7/2001 Iggulden
6,271,840 B1 8/2001 Finseth et al.
6,275,820 B1 8/2001 Navin-Chandra et al.
6,275,829 B1 8/2001 Angiulo et al.
6,356,879 B2 3/2002 Aggarwal et al.
6,356,905 B1 3/2002 Gershman et al.
6,356,908 B1 3/2002 Brown et al.
6,366,899 B1 4/2002 Kemz
6,370,527 B1 4/2002 Singhal

(56) References Cited

U.S. PATENT DOCUMENTS 6,373,933 B1 4/2002 Sarkki et al.
6,374,260 B1 4/2002 Hoffert et al.
6,381,510 B1 4/2002 Amidhozour et al.
6,415,270 B1 7/2002 Rackson et al.
6,415,320 B1 7/2002 Hess et al.
6,434,556 B1 8/2002 Levin et al.
6,456,307 B1 9/2002 Bates et al.
6,460,020 B1 10/2002 Pool et al.
6,466,917 B1 10/2002 Goyal et al.
6,484,149 B1 11/2002 Jammes et al.
6,489,968 B1 12/2002 Ortega et al.
6,522,955 B1 2/2003 Colborn
6,523,037 B1 2/2003 Monahan et al.
6,601,061 B1 7/2003 Holt et al.
6,604,107 B1 8/2003 Wang
6,625,764 B1 9/2003 Dawson
6,643,696 B2 11/2003 Davis et al.
6,661,431 B1 12/2003 Stuart et al.
6,665,838 B1 12/2003 Brown et al.
6,675,178 B1 1/2004 Cinchar et al.
6,694,436 B1 2/2004 Audebert
6,701,310 B1 3/2004 Sugiura et al.
6,718,536 B2 4/2004 Dupaquis
6,725,268 B1 4/2004 Jackel et al.
6,728,704 B2 4/2004 Mao et al.
6,732,161 B1 5/2004 Hess et al.
6,732,162 B1 5/2004 Wood et al.
6,801,909 B2 10/2004 Delgado et al.
6,856,963 B1 2/2005 Hurwitz
6,889,054 B2 5/2005 Himmel et al.
6,907,401 B1 6/2005 Vittal et al.
6,912,505 B2 6/2005 Linden et al.
6,978,273 B1 12/2005 Bonneau et al.
7,043,450 B2 5/2006 Velez et al.
7,069,242 B1 6/2006 Sheth et al.
7,076,453 B2 7/2006 Jammes et al.
7,076,504 B1 7/2006 Handel et al.
7,080,030 B2 7/2006 Eglen et al.
7,099,891 B2 8/2006 Harris et al.
7,100,111 B2 8/2006 McElfresh et al.
7,100,195 B1 8/2006 Underwood
7,117,207 B1 10/2006 Kerschberg et al.
7,127,416 B1 10/2006 Tenorio
7,165,091 B2 1/2007 Lunenfeld
7,167,910 B2 1/2007 Farnham et al.
7,216,115 B1 5/2007 Walters et al.
7,240,016 B1 7/2007 Sturgis et al.
7,254,547 B1 8/2007 Beck et al.
7,305,614 B2 12/2007 Chen et al.
7,318,037 B2 1/2008 Solari
7,324,966 B2 1/2008 Scheer
7,340,249 B2 3/2008 Moran et al.
7,349,668 B2 3/2008 Ilan et al.
7,353,188 B2 4/2008 Yim et al.
7,366,755 B1 4/2008 Cuomo et al.
7,379,890 B2 5/2008 Myr et al.
7,380,217 B2 5/2008 Gvelesiani
7,383,320 B1 6/2008 Silberstein et al.
7,401,025 B1 7/2008 Lokitz
7,447,646 B1 11/2008 Agarwal et al.
7,451,476 B1 11/2008 Banks et al.
7,454,464 B2 11/2008 Puthenkulam et al.
7,457,730 B2 11/2008 Degnan
7,493,521 B1 2/2009 Li et al.
7,496,525 B1 2/2009 Mitchell
7,496,527 B2 2/2009 Silverstein et al.
7,496,582 B2 2/2009 Farnham et al.
7,516,094 B2 4/2009 Perkowski
7,539,696 B1 5/2009 Greener et al.
7,546,625 B1 6/2009 Kamangar
7,552,067 B2 6/2009 Nephew et al.
7,565,615 B2 7/2009 Ebert
7,606,743 B2 10/2009 Orzell et al.
7,610,212 B2 10/2009 Klett et al.
7,653,573 B2 1/2010 Hayes, Jr. et al.
7,834,883 B2 11/2010 Adams
7,904,348 B2 3/2011 Johnson et al.
7,912,748 B1 3/2011 Rosenberg et al.
7,921,031 B2 4/2011 Crysel et al.
7,941,751 B2 5/2011 Ebert
7,979,340 B2 7/2011 Macdonald Korth et al.
7,983,950 B2 7/2011 De Vita
7,983,963 B2 7/2011 Byrne et al.
8,086,643 B1 12/2011 Tenorio
8,112,303 B2 2/2012 Eglen et al.
8,140,989 B2 3/2012 Cohen et al.
8,166,155 B1 4/2012 Rachmeler et al.
8,204,799 B1 6/2012 Murray et al.
8,214,264 B2 7/2012 Kasavin et al.
8,214,804 B2 7/2012 Robertson
8,260,852 B1 9/2012 Cselle
8,312,056 B1 11/2012 Peng et al.
8,326,662 B1 12/2012 Byrne et al.
8,370,269 B2 2/2013 MacDonald-Korth et al.
8,370,435 B1 2/2013 Bonefas et al.
8,392,356 B2 3/2013 Stoner et al.
8,452,691 B2 5/2013 MacDonald Korth et al.
8,473,316 B1 6/2013 Panzitta et al.
8,494,912 B2 7/2013 Fraser et al.
8,545,265 B2 10/2013 Sakamoto et al.
8,577,740 B1 11/2013 Murray et al.
8,583,480 B2 11/2013 Byrne
8,630,960 B2 1/2014 Gross
8,676,632 B1 3/2014 Watson et al.
8,693,494 B2 4/2014 Fiatal
8,719,075 B2 5/2014 MacDonald Korth et al.
8,793,650 B2 7/2014 Hilerio et al.
9,047,341 B2 6/2015 Pan
9,047,642 B2 6/2015 Byrne et al.
9,448,692 B1 9/2016 Mierau et al.
9,483,788 B2 11/2016 Martin
9,741,080 B1 8/2017 Byrne
9,747,622 B1 8/2017 Johnson et al.
9,805,425 B2 10/2017 MacDonald-Korth et al.
9,928,752 B2 3/2018 Byrne et al.
9,940,659 B1 4/2018 Behbahani et al.
10,074,118 B1 9/2018 Johnson et al.
10,102,287 B2 10/2018 Martin
10,269,081 B1 4/2019 Byrne
10,423,997 B2 9/2019 MacDonald Korth et al.
10,534,845 B2 1/2020 Noursalehi et al.
11,176,598 B2 * 11/2021 D'Souza ................ G06N 3/084
2001/0014868 A1 8/2001 Herz et al.
2001/0034667 A1 10/2001 Petersen
2001/0034668 A1 10/2001 Whitworth
2001/0044751 A1 11/2001 Pugliese, III et al.
2001/0047290 A1 11/2001 Petras et al.
2001/0047308 A1 11/2001 Kaminsky et al.
2001/0051996 A1 12/2001 Cooper et al.
2002/0002513 A1 1/2002 Chiasson
2002/0007356 A1 1/2002 Rice et al.
2002/0013721 A1 1/2002 Dabbiere et al.
2002/0019763 A1 2/2002 Linden et al.
2002/0022995 A1 2/2002 Miller et al.
2002/0023059 A1 2/2002 Bari et al.
2002/0026390 A1 2/2002 Ulenas et al.
2002/0029187 A1 3/2002 Meehan et al.
2002/0038312 A1 3/2002 Donner et al.
2002/0040352 A1 4/2002 McCormick
2002/0042738 A1 4/2002 Srinivasan et al.
2002/0049622 A1 4/2002 Lettich et al.
2002/0056044 A1 5/2002 Andersson
2002/0099578 A1 7/2002 Eicher, Jr. et al.
2002/0099579 A1 7/2002 Stowell et al.
2002/0099602 A1 7/2002 Moskowitz et al.
2002/0107718 A1 8/2002 Morrill et al.
2002/0107853 A1 8/2002 Hofmann et al.
2002/0111826 A1 8/2002 Potter et al.
2002/0120537 A1 8/2002 Morea et al.
2002/0123957 A1 9/2002 Notarius et al.
2002/0124100 A1 9/2002 Adams
2002/0129282 A1 9/2002 Hopkins
2002/0133502 A1 9/2002 Rosenthal et al.
2002/0138399 A1 9/2002 Hayes et al.

(56) References Cited

U.S. PATENT DOCUMENTS

2002/0147625 A1 10/2002 Koike, Jr.
2002/0156802 A1 10/2002 Takayama et al.
2002/0161648 A1 10/2002 Mason et al.
2002/0188777 A1 12/2002 Kraft et al.
2002/0194049 A1 12/2002 Boyd
2002/0198784 A1 12/2002 Shaak et al.
2002/0198882 A1 12/2002 Linden et al.
2003/0004855 A1 1/2003 Dutta et al.
2003/0005046 A1 1/2003 Kavanagh et al.
2003/0009362 A1 1/2003 Cifani et al.
2003/0009392 A1 1/2003 Perkowski
2003/0014400 A1 1/2003 Siegel
2003/0028451 A1 2/2003 Ananian
2003/0028605 A1 2/2003 Millett et al.
2003/0032409 A1 2/2003 Hutcheson et al.
2003/0035138 A1 2/2003 Schilling
2003/0036914 A1 2/2003 Fitzpatrick et al.
2003/0040970 A1 2/2003 Miller
2003/0041008 A1 2/2003 Grey et al.
2003/0046149 A1 3/2003 Wong
2003/0069740 A1 4/2003 Zeidman
2003/0069790 A1 4/2003 Kane
2003/0069825 A1 4/2003 Hoffman et al.
2003/0083961 A1 5/2003 Bezos et al.
2003/0088467 A1 5/2003 Culver
2003/0088511 A1 5/2003 Karboulonis et al.
2003/0093331 A1 5/2003 Childs et al.
2003/0097352 A1 5/2003 Gulla et al.
2003/0105682 A1 6/2003 Dicker et al.
2003/0110100 A1 6/2003 Wirth, Jr.
2003/0119492 A1 6/2003 Timmins et al.
2003/0131095 A1 7/2003 Kumhyr et al.
2003/0139969 A1 7/2003 Scroggie et al.
2003/0140007 A1 7/2003 Kramer et al.
2003/0140121 A1 7/2003 Adams
2003/0158792 A1 8/2003 Perkowski
2003/0163340 A1 8/2003 Fitzpatrick et al.
2003/0167213 A1 9/2003 Jammes et al.
2003/0167222 A1 9/2003 Mehrotra et al.
2003/0177103 A1 9/2003 Ivanov et al.
2003/0187745 A1 10/2003 Hobday et al.
2003/0200156 A1 10/2003 Roseman et al.
2003/0204449 A1 10/2003 Kotas et al.
2003/0217002 A1 11/2003 Enborg
2003/0220835 A1 11/2003 Barnes, Jr.
2004/0006509 A1 1/2004 Mannik et al.
2004/0015416 A1 1/2004 Foster et al.
2004/0029567 A1 2/2004 Timmins et al.
2004/0041836 A1 3/2004 Zaner et al.
2004/0044563 A1 3/2004 Stein
2004/0055017 A1 3/2004 Delpuch et al.
2004/0058710 A1 3/2004 Timmins et al.
2004/0073476 A1 4/2004 Donahue et al.
2004/0078388 A1 4/2004 Melman
2004/0107136 A1 6/2004 Nemirofsky et al.
2004/0117242 A1 6/2004 Conrad et al.
2004/0122083 A1 6/2004 Pettit et al.
2004/0122681 A1 6/2004 Ruvolo et al.
2004/0122735 A1 6/2004 Meshkin
2004/0122855 A1 6/2004 Ruvolo et al.
2004/0128183 A1 7/2004 Challey et al.
2004/0128283 A1 7/2004 Wang et al.
2004/0128320 A1 7/2004 Grove et al.
2004/0143731 A1 7/2004 Audebert et al.
2004/0148232 A1 7/2004 Fushimi et al.
2004/0172323 A1 9/2004 Stamm
2004/0172379 A1 9/2004 Mott et al.
2004/0174979 A1 9/2004 Hutton et al.
2004/0186766 A1 9/2004 Fellenstein et al.
2004/0199496 A1 10/2004 Liu et al.
2004/0199905 A1 10/2004 Fagin et al.
2004/0204989 A1 10/2004 Dicker et al.
2004/0204991 A1 10/2004 Monahan et al.
2004/0230989 A1 11/2004 Macey et al.
2004/0240642 A1 12/2004 Crandell et al.
2004/0249727 A1 12/2004 Cook Jr. et al.
2004/0267717 A1 12/2004 Slackman
2005/0010925 A1 1/2005 Khawand et al.
2005/0021666 A1 1/2005 Dinnage et al.
2005/0038733 A1 2/2005 Foster et al.
2005/0044254 A1 2/2005 Smith
2005/0055306 A1 3/2005 Miller et al.
2005/0060664 A1 3/2005 Rogers
2005/0097204 A1 5/2005 Horowitz et al.
2005/0114229 A1 5/2005 Ackley et al.
2005/0120311 A1 6/2005 Thrall
2005/0131837 A1 6/2005 Sanctis et al.
2005/0144064 A1 6/2005 Calabria et al.
2005/0193333 A1 9/2005 Ebert
2005/0197846 A1 9/2005 Pezaris et al.
2005/0197950 A1 9/2005 Moya et al.
2005/0198031 A1 9/2005 Pezaris et al.
2005/0202390 A1 9/2005 Allen et al.
2005/0203888 A1 9/2005 Woosley et al.
2005/0216300 A1 9/2005 Appelman et al.
2005/0262067 A1 11/2005 Lee et al.
2005/0273378 A1 12/2005 MacDonald-Korth et al.
2006/0009994 A1 1/2006 Hogg et al.
2006/0010105 A1 1/2006 Sarukkai et al.
2006/0015498 A1 1/2006 Sarmiento et al.
2006/0031240 A1 2/2006 Eyal et al.
2006/0041638 A1 2/2006 Whittaker et al.
2006/0058048 A1 3/2006 Kapoor et al.
2006/0069623 A1 3/2006 MacDonald Korth et al.
2006/0085251 A1 4/2006 Greene
2006/0173817 A1 8/2006 Chowdhury et al.
2006/0206479 A1 9/2006 Mason
2006/0230035 A1 10/2006 Bailey et al.
2006/0235752 A1 10/2006 Kavanagh et al.
2006/0259360 A1 11/2006 Flinn et al.
2006/0271671 A1 11/2006 Hansen
2006/0282304 A1 12/2006 Bedard et al.
2007/0005424 A1 1/2007 Arauz
2007/0027760 A1 2/2007 Collins et al.
2007/0027814 A1 2/2007 Tuoriniemi
2007/0073641 A1 3/2007 Perry et al.
2007/0077025 A1 4/2007 Mino
2007/0078726 A1 4/2007 MacDonald Korth et al.
2007/0078849 A1 4/2007 Slothouber
2007/0083437 A1 4/2007 Hamor
2007/0094597 A1 4/2007 Rostom
2007/0100803 A1 5/2007 Cava
2007/0130090 A1 6/2007 Staib et al.
2007/0160345 A1 7/2007 Sakai et al.
2007/0162379 A1 7/2007 Skinner
2007/0174108 A1 7/2007 Monster
2007/0192168 A1 8/2007 Van Luchene
2007/0192181 A1 8/2007 Asdourian
2007/0206606 A1 9/2007 Coleman et al.
2007/0214048 A1 9/2007 Chan et al.
2007/0226679 A1 9/2007 Jayamohan et al.
2007/0233565 A1 10/2007 Herzog et al.
2007/0239534 A1 10/2007 Liu et al.
2007/0245013 A1 10/2007 Saraswathy et al.
2007/0260520 A1 11/2007 Jha et al.
2007/0282666 A1 12/2007 Afeyan et al.
2007/0288298 A1 12/2007 Gutierrez et al.
2007/0299743 A1 12/2007 Staib et al.
2008/0015938 A1 1/2008 Haddad et al.
2008/0021763 A1 1/2008 Merchant
2008/0052152 A1 2/2008 Yufik
2008/0071640 A1 3/2008 Nguyen
2008/0082394 A1 4/2008 Floyd et al.
2008/0103893 A1 5/2008 Nagarajan et al.
2008/0120342 A1 5/2008 Reed et al.
2008/0126205 A1 5/2008 Evans et al.
2008/0126476 A1 5/2008 Nicholas et al.
2008/0133305 A1 6/2008 Yates et al.
2008/0140765 A1 6/2008 Kelaita et al.
2008/0162574 A1 7/2008 Gilbert
2008/0201218 A1 8/2008 Broder et al.
2008/0215456 A1 9/2008 West et al.
2008/0288338 A1 11/2008 Wiseman et al.
2008/0294536 A1 11/2008 Taylor et al.

(56) References Cited

U.S. PATENT DOCUMENTS

2008/0300909 A1 12/2008 Rikhtverchik et al.
2008/0301009 A1 12/2008 Plaster et al.
2008/0305869 A1 12/2008 Konforty et al.
2008/0313010 A1 12/2008 Jepson et al.
2009/0006190 A1 1/2009 Lucash et al.
2009/0030755 A1 1/2009 Altberg et al.
2009/0030775 A1 1/2009 Vieri
2009/0037355 A1 2/2009 Brave et al.
2009/0106080 A1 4/2009 Carrier et al.
2009/0106127 A1 4/2009 Purdy et al.
2009/0110181 A1 4/2009 Koenig et al.
2009/0119167 A1 5/2009 Kendall et al.
2009/0157537 A1 6/2009 Miller
2009/0164323 A1 6/2009 Byrne
2009/0182589 A1 7/2009 Kendall et al.
2009/0204848 A1 8/2009 Kube et al.
2009/0222348 A1 9/2009 Ransom et al.
2009/0222737 A1 9/2009 Liesche et al.
2009/0234722 A1 9/2009 Evevsky
2009/0240582 A1 9/2009 Sheldon-Neal et al.
2009/0276284 A1 11/2009 Yost
2009/0276305 A1 11/2009 Clopp
2009/0292677 A1 11/2009 Kim
2009/0293019 A1 11/2009 Raffel et al.
2009/0313173 A1 12/2009 Singh et al.
2010/0042684 A1 2/2010 Broms et al.
2010/0070448 A1 3/2010 Omoigui
2010/0076816 A1 3/2010 Phillips
2010/0076851 A1 3/2010 Jewell, Jr.
2010/0094673 A1 4/2010 Lobo et al.
2010/0107123 A1 4/2010 Sareen et al.
2010/0145831 A1 6/2010 Esfandiar et al.
2010/0146413 A1 6/2010 Yu
2010/0228617 A1 9/2010 Ransom et al.
2011/0010656 A1 1/2011 Mokotov
2011/0055054 A1 3/2011 Glasson
2011/0060621 A1 3/2011 Weller et al.
2011/0103699 A1 5/2011 Ke et al.
2011/0131253 A1 6/2011 Peukert et al.
2011/0153383 A1 6/2011 Bhattacharjya et al.
2011/0153663 A1 6/2011 Koren et al.
2011/0173076 A1 7/2011 Eggleston et al.
2011/0196802 A1 8/2011 Ellis et al.
2011/0225050 A1 9/2011 Varghese
2011/0231226 A1 9/2011 Golden
2011/0231383 A1 9/2011 Smyth et al.
2011/0258049 A1 10/2011 Ramer et al.
2011/0271204 A1 11/2011 Jones et al.
2011/0276513 A1 11/2011 Erhart et al.
2011/0289068 A1 11/2011 Feevan et al.
2012/0005187 A1 1/2012 Chavanne
2012/0030067 A1 2/2012 Pothukuchi et al.
2012/0084135 A1 4/2012 Nissan et al.
2012/0158715 A1 6/2012 Maghoul et al.
2012/0164619 A1 6/2012 Meer
2012/0166299 A1 6/2012 Heinstein et al.
2012/0231424 A1 9/2012 Caiman et al.
2012/0233312 A1 9/2012 Ramakumar et al.
2012/0278388 A1 11/2012 Kleinbart et al.
2012/0284336 A1 11/2012 Schmidt et al.
2013/0031470 A1 1/2013 Daly, Jr. et al.
2013/0073392 A1 3/2013 Allen et al.
2013/0080200 A1 3/2013 Connolly et al.
2013/0080426 A1 3/2013 Chen et al.
2013/0085893 A1 4/2013 Bhardwaj et al.
2013/0144870 A1 6/2013 Gupta et al.
2013/0145254 A1 6/2013 Masuko et al.
2013/0151331 A1 6/2013 Avner et al.
2013/0151388 A1 6/2013 Falkenborg et al.
2013/0185164 A1 7/2013 Pottjegort
2013/0191409 A1 7/2013 Zeng et al.
2013/0254059 A1 9/2013 Teo
2013/0268561 A1 10/2013 Christie et al.
2014/0019313 A1 1/2014 Hu et al.
2014/0025509 A1 1/2014 Reisz et al.
2014/0032544 A1 1/2014 Mathieu et al.
2014/0114680 A1 4/2014 Mills et al.
2014/0136290 A1 5/2014 Schiestl et al.
2014/0172652 A1 6/2014 Pobbathi et al.
2014/0180758 A1 6/2014 Agarwal et al.
2014/0200959 A1 7/2014 Sarb et al.
2014/0259056 A1 9/2014 Grusd
2014/0289005 A1 9/2014 Laing et al.
2014/0337090 A1 11/2014 Tavares
2014/0372415 A1 12/2014 Fernandez-Ruiz
2015/0019958 A1 1/2015 Ying et al.
2015/0286742 A1 10/2015 Zhang et al.
2015/0287066 A1 10/2015 Wortley et al.
2017/0344622 A1 11/2017 Islam et al.
2019/0043106 A1* 2/2019 Talmor .................. G06N 20/00
2019/0130904 A1* 5/2019 Homma ............... G06N 3/0445
2019/0325868 A1* 10/2019 Lecue ..................... G10L 15/22
2020/0065357 A1 2/2020 Noursalehi et al.
2020/0184540 A1* 6/2020 D'Souza ................ G06N 3/006
2020/0218766 A1* 7/2020 Yaseen .................. G06F 16/252

FOREIGN PATENT DOCUMENTS

EP 0636993 4/1999
EP 0807891 5/2000
EP 1241603 9/2002
GB 2397400 1/2003
GB 2424098 9/2006
JP 2001283083 12/2001
JP 2002318935 10/2002
JP 2007021920 2/2007
JP 2009505238 2/2009
WO WO9717663 5/1997
WO WO9959283 5/1998
WO WO9832289 7/1998
WO WO9847082 10/1998
WO WO9849641 11/1998
WO WO0025218 5/2000
WO WO0109803 2/2001
WO WO0182135 11/2001
WO WO0197099 12/2001
WO WO0237234 5/2002
WO WO03094080 11/2003
WO WO2007021920 2/2007
WO WO2012093410 7/2012
WO WO2015116038 8/2015
WO WO2015176071 11/2015

OTHER PUBLICATIONS

2Roam, Inc., multiple archived pages of www.2roam.com retrieved via Internet Archive Wayback Machine on Jun. 10, 2008.

Alt et al., "Bibliography on Electronic Commerce," Electronic Markets—The International Journal, Oct. 1993, 5 pages, vol. 3, No. 3.

Alt et al., "Computer Integrated Logistics," Electronic Markets—The International Journal, Oct. 1993, 1 page, vol. 1, No. 3.

Anonymous, Image manipulation (image-editing software and image-manipulation systems)(Seybold Special Report, Part II), Seybold Reporton Publishing Systems, May 15, 1995, pS35(9), vol. 24, No. 18.

Auctionwatch.com, multiple pages—including search results for "expedition," printed Apr. 21, 2011.

Auctiva.com, multiple pages, undated but website copyright date is "1999-2000."

Ball et al., "Supply chain infrastructures: system integration and information sharing," ACM SIGMOD Record, 2002, vol. 31, No. 1, pp. 61-66.

Berger et al., "Random Ultiple-Access Communication and Group Testing," IEEE, 1984.

Braganza, "Is Resarch at Cranfield—A Look at the Future," Electronic Markets—The International Journal, Oct. 1993, 1 page, vol. 3, No. 3.

Brecht et al., "The IM 2000 Research Programme," Electronic Markets—The International Journal, Oct. 1993, 1 page, vol. 3, No. 3.

(56) References Cited

OTHER PUBLICATIONS

Business Wire business/technology editors, “Sellers Flock to OutletZoo.com as New Automatic Price Drop Method Moves Excess Inventory Online,” Business Wire, Oct. 25, 1999.
Business Wire business editors/high-tech writers, “PictureWorks Technology, Inc. Expands in Real Estate Market with Adoption of Rimfire on Realtor.com,” Business Wire, Nov. 8, 1999.
Business Wire business editors/high-tech writers, “PictureWorks Technology, Inc. Shows Strong Revenue Growth in Internet Imaging Business,” Business Wire, Nov. 10, 1999.
Business Wire business editors/high-tech writers, “2Roam Partners with Pumatech to Delivery Wireless Alerts,” Business Wire, Dec. 18, 2000.
Business Wire business editors/high-tech writers, “2Roam Takes eHow’s How-to Solutions Wireless: With 2Roam, the Web’s One-Stop Source for getting Things Done is on More Wireless Devices, with Ability to Purchase Its Products from Anywhere,” Business Wire, Oct. 2, 2000.
Business Wire business editors/high-tech writers, “2Roam Drives Hertz to the Wireless Web: Number One Car Rental Company to Provide Customers Wireless Access from Any Device,” Business Wire, Aug. 7, 2001.
Buy.com, www.buy.com homepage, printed Oct. 13, 2004.
Chen et al., “Detecting Web Page Structure for Adaptive Viewing on Small Form Factor Devices,” ACM, May 20-24, 2003.
Chen, M. (2007). Knowledge assisted data management and retrieval in multimedia database systems (Order No. 3268643).
Y.K. Choi and S. K. Kim, “An auxiliary reccomendation system for repetitively purchasing items in E-commerce,” 2014 International Conference on Big Data and Smart Computing (BIGCOMP), Bangkok, 2014, pp. 96-98. (Year 2014).
Clarke, “Research Programme in Supra-organizational Systems,” Electronic Markets —The International Journal, Oct. 1993, 2 pages, vol. 3, No. 3.
Clemons et al., “Evaluating the prospects for alternative electronic securities markets,” Proceedings of the twelfth international conference on information systems, New York, New York, United States, pp. 53-64, 1991.
Fan, J., Keim, F.A., Gao, Y., Luo, H. and Li, Z. (2009). JustClick: Personalized Image Recommendation via Exploratory Search from Large-Scale Flickr Images. Feb. 2009. IEEE Transactions on Circuits and Systems for Video Technology, 19(2), pp. 2730288. (Year: 2009).
Friendster.com, homepage and “more info” pages, printed Apr. 29, 2004.
Google News archive search for “2Roam marketing” performed over the date range 2000-2003.
Google News archive search for “2Roam SMS” performed over the date range 2000-2008.
Grabowski et al., “Mobile-enabled grid middleware and/or grid gateways,” GridLab—A Grid Application Toolkit and Testbed, Work Package 12—Access for Mobile Users, Jun. 3, 2003.
Graham, “The Emergence of Linked Fish Markets in Europe,” Electronic Markets—The International Journal, Jul. 1993, 4 pages, vol. 8, No. 2.
Gunthorpe et al., “Portfolio Composition and the Investment Horizon,” Financial Analysts Journal, Jan.-Feb. 1994, pp. 51-56.
Halperin, “Toward a Process Handbook for Organizational Coordination Processes,” Electronic Markets—The International Journal, Oct. 1993, 1 page, vol. 3, No. 3.
Hess et al., “Computerized Loan Origination Systems: An Industry Case Study of the Electronic Markets Hypothesis,” MIS Quarterly, Sep. 1994, pp. 251-275.
IBM, “Anyonymous Delivery of Goods in Electronic Commerce,” IBM Technical Disclosure Bulletin, Mar. 1996, pp. 363-366, vol. 39, No. 3.
IBM, “Personal Optimized Decision/Transaction Program,” IBM Technical Disclosure Bulletin, Jan. 1995, pp. 83-84, vol. 38, No. 1.
ICROSSING, “ICROSSING Search Synergy: Natural & Paid Search Symbiosis,” Mar. 2007.
IEEE 100—The Authoritative Dictionary of IEEE Standard Terms, Seventh Edition, 2000. Entire book cited; table of contents, source list, and terms beginning with A included. ISBN 0-7381-2601-2a.
Ves et al., “Editor’s Comments - MISQ Central: Creating a New Intellectual Infrastructure,” MIS Quarterly, Sep. 1994, page xxxv.
Joshi, “Information visibility and its effect on supply chain dynamics,” Ph.D. dissertation, Massachusetts Institute of Technology, 2000 (fig. 4.5; p. 45).
Klein, “Information Logistics,” Electronic Markets—The International Journal, Oct. 1993, pp. 11-12, vol. 3, No. 3.
Klein, “Introduction to Electronic Auctions,” Electronic Markets—The International Journal, Dec. 1997, 4 pages, vol. 7, No. 4.
Kubicek, “The Organization Gap,” Electronic Markets—The International Journal, Oct. 1993, 1 page, vol. 3, No. 3.
S. Kulkarni, A. M. Sankpal, R.R. Mudholkar and Kirankumari, “Recommendation engine: Matching individual/group profiles for better shopping experience,” 2013 15th International Conference on Advanced Computing Technologies (ICACT), Rajampet, 2013, pp. 1-6. (Year: 2013).
Kuula, “Telematic Services in Finland,” Electronic Markets—The International Journal, Oct. 1993, 1 page, vol. 3, No. 3.
Lalonde, “The EDI World Institute: An International Approach,” Electronic Markets—The International Journal, Oct. 1993, 1 page, vol. 3, No. 3.
Lee et al., “Intelligent Electronic Trading for Commodity Exchanges,” Electronic Markets—The International Journal, Oct. 1993, 2 pages, vol. 3, No. 3.
Lee et al., “Electronic Brokerage and Electronic Auction: The Impact of IT on Market Structures,” Proceedings of the 29th Annual Hawaii International Conference on System Sciences, 1996, pp. 397-406.
Lee, “AUCNET: Electronic Intermediary for Used-Car Transactions,” Electronic Market—The International Journal, Dec. 1997, pp. 24-28, vol. 7, No. 4.
T.Y. Lee, S. Li and R. Wei, “Needs-Centric Searching and Ranking Based on Customer Reviews,” 2008 10th IEEE Conference on E-Commerce Technology and the Fifth IEEE Conference on Enterprise Computing, E-Commerce and E-Services, Washington, DC, 2008, pp. 128-135. (Year: 2008).
Levy, Michael, and Dhruv Grewal. “Supply chain management in a networked economy.” Journal Retailing 76.4 (2000): 415-429.
LIVE365 press release, “Live365 to Offer Opt-In Advertising on Its Website,” Oct. 15, 2004.
London Business School, “Overture and Google: Internet Pay-Per-Click (PPC) Advertising Options,” Mar. 2003.
M2 Presswire, “Palm, Inc.: Palm unveils new web browser optimised for handhelds; HTML browser offers high-speed web-browsing option,” Mar. 13, 2002.
Malone et al., “Electronic Markets and Electronic Hierarchies,” Communications of the ACM, Jun. 1987, pp. 484-497, vol. 30, No. 6.
Mansell et al., “Electronic Trading Networks: The Route to Competitive Advantage?” Electronic Markets—The International Journal, Oct. 1993, 1 page, vol. 3, No. 3.
Mardesich, “Onsale takes auction gavel electronic,” Computer Reseller News, Jul. 8, 1996, pp. 2, 32.
Marteau, “Shop with One Click, Anywhere, Anytime,” Information Management and Consulting, 2000, pp. 44-46, vol. 15, No. 4.
Massimb et al., “Electronic Trading, Market Structure and Liquidity,” Financial Analysts Journal, Jan.-Feb. 1994, pp. 39-49.
McGinnity, “Build Your Weapon,” PC Magazine, Apr. 24, 2011, printed from www.pcmag.com/print_article2?0,1217, a%253D3955,00.asp.
Meade, “Visual 360: a performance appraisal system that’s ‘fun,’” HR Magazine, 44, 7, 118(3), Jul. 1999.
“Mediappraise: Mediappraise Receives National Award for Web-Based Technology That Enables Companies to Solve Thorny HR Problem,” Dec. 14, 1998.
Medvinsky et al., “Electronic Currency for the Internet,” Electronic Markets—The International Journal, Oct. 1993, 2 pages, vol. 3, No. 3.
Metails.com, www.metails.com homepage, printed Oct. 13, 2004.

(56) References Cited

OTHER PUBLICATIONS

Microsoft Computer Dictionary, Fifth Edition, front matter and p. 33.
Microsoft Computer Dictionary, Fifth Edition, front matter, back matter, and pp. 479,486.
Neches, "FAST—A Research Project in Electronic Commerce," Electronic Markets—The International Journal, Oct. 1993, 4 pages, vol. 3., No. 3.
Neisser, "Which is better for Social Media Monitoring: TweetDeck or SproutSocial" Mar. 17, 2011, Social Media Examiner, https://www.socialmediaexaminer.com/which-is-better-for-social-media-monitoring-tweetdeck-or-sproutsocial/.
Neo, "The implementation of an electronic market for pig trading in Singapore," Journal of Strategic Information Systems, Dec. 1992, pp. 278-288, vol. 1, No. 5.
O'Mahony, "An X.500-based Product Catalogue," Electronic Markets—The International Journal, Oct. 1993, 2 pages, vol. 3, No. 3.
"OnSale: OnSale Brings Thrill of Auctions and Bargain Hunting Online: Unique Internet retail services debuts with week-long charity auction for the Computer Museum in Boston," May 24, 1995, printed from www.dialogweb.com/cgi/dwclient?dwcommand,DWEBPRINT%20810-489267.
"OnSale joins fray as online shopping pcks up speed: Internet Booms," Comptuer Reseller News, Jun. 5, 1995.
Palm, Inc., PalmTM Web Pro Handbook, copyright 2002-2003.
Post et al., "Application of Auctions as a Pricing Mechanism for the Interchange of Electric Power," IEEE Transactions of Power Systems, Aug. 1995, pp. 1580-1584, vol. 10, No. 3.
Preist et al., "Adaptive agents in a persistent shout double auction," International Conference on Information and Computation, Proceedings of the first international conference on information and computation economies, Oct. 25-28, 1998, Charleston, United States, pp. 11-18.
Qualcomm, "Brew Developer Support," printed from web.archive.org/web/20020209194207/http://www.qualcomm.com/brew/developer/support/kb/52.html on Aug. 30, 2007.
RCR Wireless News, "Lockheed Martin to use 2Roam's technology for wireless platform," RCR Wireless News, Sep. 10, 2001.
Reck, "Formally Specifying an Automated Trade Execution System," J. Systems Software, 1993, pp. 245-252, vol. 21.
Reck, "Trading-Process Characteristics of Electronic Auctions," Electronic Markets—The International Journal, Dec. 1997, pp. 17-23, vol. 7, No. 4.
Repcheck.com, www.repcheck.com homepage, printed from web.archive.org/web/20020330183132/http://repcheck.com on Sep. 5, 2009.
Resnick et al., "Reputation Systems," Communications of the ACM, Dec. 2000, pp. 45-48, vol. 43, No. 12.
Rockoff et al., "Design of an Internet-based system for remote Dutch auctions," Internet Research: Electronic Networking Applications and Policy, 1995, pp. 10-16, vol. 5, No. 4.
Rodriguez, Camille, HootSuite vs. social Oomph vs. Tweekdeck, Jan. 4, 2012, http://polkadotimpressions.com/2012/01/04/hootsuite-vs-social-oopmphvs.tweetdeck/ (Year: 2012).
Rose, "Vendors strive to undo Adobe lock-hold," Computer Reseller News, Feb. 5, 1996, n 66669, p. 71(7).
Ross, David Frederick, Frederick S. Weston, and W. Stephen. Introduction to supply chain management technologies. CRC Press, 2010.
Rysavy, "Mobile-commerce ASPs do the legwork," Network Computing, Jan. 22, 2001, p. 71, 6 pgs. , vol. 12, No. 2.
Saunders, "AdFlight to Offer WAP Ads," Oct. 17, 2000, printed from clickz.com/487531/print.
Schaffer, Neil, The Top 20 Twitter clients—HootSuite, TweetDeck and More, Jan. 31, 2012, https://maximizesocialbusinss.com/top-20-twitter-clients-2012-9175/ (Year: 2012).
Schmid, "Electronic Markets," Electronic Markets—The International Journal, Oct. 1993, 2 pages, vol. 3, No. 3.
Schwankert, "Matsushita Taps 2Roam for Wireless Solutions," www.internetnews.com/bus-news.article.php/674811, Feb. 2, 2001.
Sen, "Inventory and Pricing Models for Perishable Products," Doctor of Philosophy Dissertation—University of Southern California, Aug. 2000.
Siegmann, "Nowhere to go but up," PC Week, Oct. 23, 1995, 3 pages, vol. 12, No. 42.
Telephony Staff, "Air-ASP," Telephony Online, Oct. 2, 2000, 3 pages.
Teo, "Organizational Factors of Success in Using EDIS: A Survey of Tradenet Participants," Electronic Markets—The International Journal, Oct. 1993, 2 pages, vol. 3, No. 3.
Tjostheim et al., "A case study of an on-line auction for the World Wide Web," printed from www.nr.no/gem/elcom/puplikasjoner/enter98e.html on Jun. 10, 1990, 10 pages.
Turban, "Auctions and Bidding on the Internet: An Assessment," Electronic Markets—The International Journal, Dec. 1997, 5 pages, vol. 7, No. 4.
Ubid.com, "How do I Updated my Address, Phone, Credit Card, Password, etc.?" printed from web.archive.org/web/20010208113903/www.ubid.com/help/topic13asp on Aug. 30, 2007.
Ubid.com, "How do I track my shipment?" printed from web.archive.org/web/20010331032659/www.ubid.com/help/topic27.asp on Aug. 30, 2007.
Ubid.com, "Can I track all of my bids from My Page?" printed from web.archive.org/web/20010208114049/www.ubid.com/help/topic14.asp on Aug. 30, 2007.
Van Heck et al., "Experiences with Electronic Auctions in the Dutch Flower Industry," Electronic Markets—The International Journal, Dec. 1997, 6 pages, vol. 7, No. 4.
Verizon Wireless, "Verizon Wireless Customers Get It NowSM; Get Games, Get Pix, Get Ring Tones and Get Going in Full Color," press release to PRNEWSWIRE, Sep. 23, 2002.
Warbelow et al., "AUCNET: TV Auction Network System," Harvard Business School 9-190-001, Jul. 19, 1989, Rev. Apr. 12, 1996, pp. 1-15.
Weber, "How Financial Markets are Going On-line," Electronic Markets—The International Journal, Oct. 1993, 2 pages, vol. 3, No. 3.
Wireless Internet, "DailyShopper Selects 2Roam to Enable Mobile Customers to Retrieve Nearby Sales and Promotions Information," Wireless Internet, Apr. 2001.
Wireless Week, "Verizon Wireless Gets Going on BREW Agenda," Wireless Week, Sep. 23, 2002.
Xchanger.net, webpage printed from www.auctiva.com/showcases/as_4sale.asp?uid=exchanger, undated but at least as early as Oct. 12, 2000.
Yu et al., "Distributed Reputation Management for Electronic Commerce," Computational Intelligence, 2002, pp. 535-549, vol. 18, No. 4.
Zetmeir, Auction Incentive Marketing, print of all pages of website found at home.earthlink.net/~bidpointz/ made Oct. 8, 2004.
Zimmermann, "Integration of Financial Services: The TeleCounter," Electronic Markets—The International Journal, Oct. 1993, 1 page, vol. 3, No. 3.
Zwass, "Electronic Commerce: Structures and Issues," International Journal of Electronic Commerce, Fall 1996, pp. 3-23, vol. 1, No. 1.
Message Passing from Wikipedia, archived May 6, 2016, retrieved from https://en.wikipedia.org/wiki/message_passing, 4 pages.
Di et al., "A New Implementation for Ontology Mapping Based enterprise Semantic Interoperation," by Xiaofeng Di and Yushun Fan, Applied Mechanics and Materials, vols. 16-19 (2009), pp. 644-648 (Year:2009).
Nicolle et a., "XML Integration and Toolkit for B2B Applications," by Christophe Nicolle, Kokou Yetongnon, and Jean-Claude Simon, Journal of Database Management, Oct-Dec. 2003 (Year: 2003).

* cited by examiner

SYSTEM AND METHOD FOR CONVERSATIONAL COMMERCE ONLINE

CROSS-REFERENCE TO RELATED APPLICATIONS

This application claims the benefit of US Provisional Application No. 62/823,453, filed Mar. 25, 2019, which is hereby incorporated by reference herein in its entirety, including but not limited to those portions that specifically appear hereinafter, the incorporation by reference being made with the following exception: In the event that any portion of the above-referenced provisional application is inconsistent with this application, this application supersedes said above-referenced provisional application.

STATEMENT REGARDING FEDERALLY SPONSORED RESEARCH AND DEVELOPMENT

Not Applicable.

BACKGROUND

This disclosure relates generally to a system and method for creating conversational commerce through a computerized device, such as a computer, cellular phone, tablet, or other similar device, as well as voice-activated services.

Throughout history humans have used conversation as a means for enacting commerce. A human being would generally go to a store and could speak to another person and discuss the purchases he or she was going to make. That person could ask for help, ask for the details of particular items, and generally work together with a salesperson to successfully complete a mutually satisfying purchase. In addition, a salesperson could give suggestions to customers and help them with additional information regarding the items they intended to buy. The instant invention involves a system and method to pursue commerce in a similar manner, but through an artificial intelligence (AI), allowing numerous customers to have such an experience without significantly increasing the number of employees required to provide the experience.

On the Internet today, commerce more closely resembles a catalogue experience. Potential buyers search a long list of items, helped by varying search technology, but still must sort through a long list of items by simply looking at each item and the information about it. What they lack is a knowledgeable "salesperson" who can listen to what they are asking for and help them make decisions regarding the product, tell them additional information they may find useful, and create an experience tailored to each individual user, as a human being can do for them. In many cases, the volume of online commerce prohibits having a human being provide a thoughtful, tailored approach for every individual. This invention aims to remedy that situation by creating a conversational AI that can learn and tailor each situation to the individual with whom it is interacting.

The features and advantages of the disclosure will be set forth in the description that follows, and in part will be apparent from the description, or may be learned by the practice of the disclosure without undue experimentation. The features and advantages of the disclosure may be realized and obtained by means of the instruments and combinations particularly pointed out herein.

SUMMARY OF THE DISCLOSURE

A purpose of the instant disclosure is to create a conversational artificial intelligence (AI) capable of interacting with a human being through conversational user interfaces (UIs) such as chat, voice, and social media. The conversational AI is capable of guiding a human being through a virtual interaction while communicating and humanizing the interaction. Ideally a person would be able to make a request, whether through voice or through typing at the computer, phone, tablet, or voice-activated service, and have the system interpret that request while making additional, natural communications with the person, such as suggesting additional items, asking additional questions to gain more information when needed, and learning from interactions. The AI simulates a human being on the website, responding to the user, and asks for additional information, as if a person were actually at a brick-and-mortar store interacting with a salesperson. In addition, the AI uses machine learning capabilities to become more familiar with an individual and better help that person, as if the person has an individual salesperson for them which never changes throughout various interactions.

DETAILED DESCRIPTION

For the purposes of promoting an understanding of the principles in accordance with this disclosure, reference will now be made to illustrative embodiments of the invention. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

Before the devices, systems, processes and methods will be disclosed and described, it is to be understood that this disclosure is not limited to the particular configurations, process steps, and materials disclosed herein, as such configurations, process steps, and materials may vary somewhat. It is also to be understood that the terminology employed herein is used for the purpose of describing particular illustrative embodiments only and is not intended to be limiting since the scope of the disclosure will be limited only by the appended claims and equivalents thereof.

In describing and claiming the subject matter of the disclosure, the following terminology will be used in accordance with the definitions set out below.

It must be noted that, as used in this specification and the appended claims, the singular forms "a", "an", and "the" include plural referents unless the context clearly dictates otherwise.

As used herein, the terms "comprising," "including," "containing," "characterized by," "having" and grammatical equivalents thereof are inclusive or open-ended terms that do not exclude additional, unrecited elements or method steps.

As used herein, a "bot" (short for "robot") is an automated program that runs over the Internet. As is known in the art, some bots run automatically, while others only execute commands when they receive specific input. See https://techterms.com/definition/bot. As used herein, "artificial intelligence" or "AI" is the ability of a computer to act like a human being and/or a program designed to do so. See https://techterms.com/definition/artificial intelligence.

Figure 1:
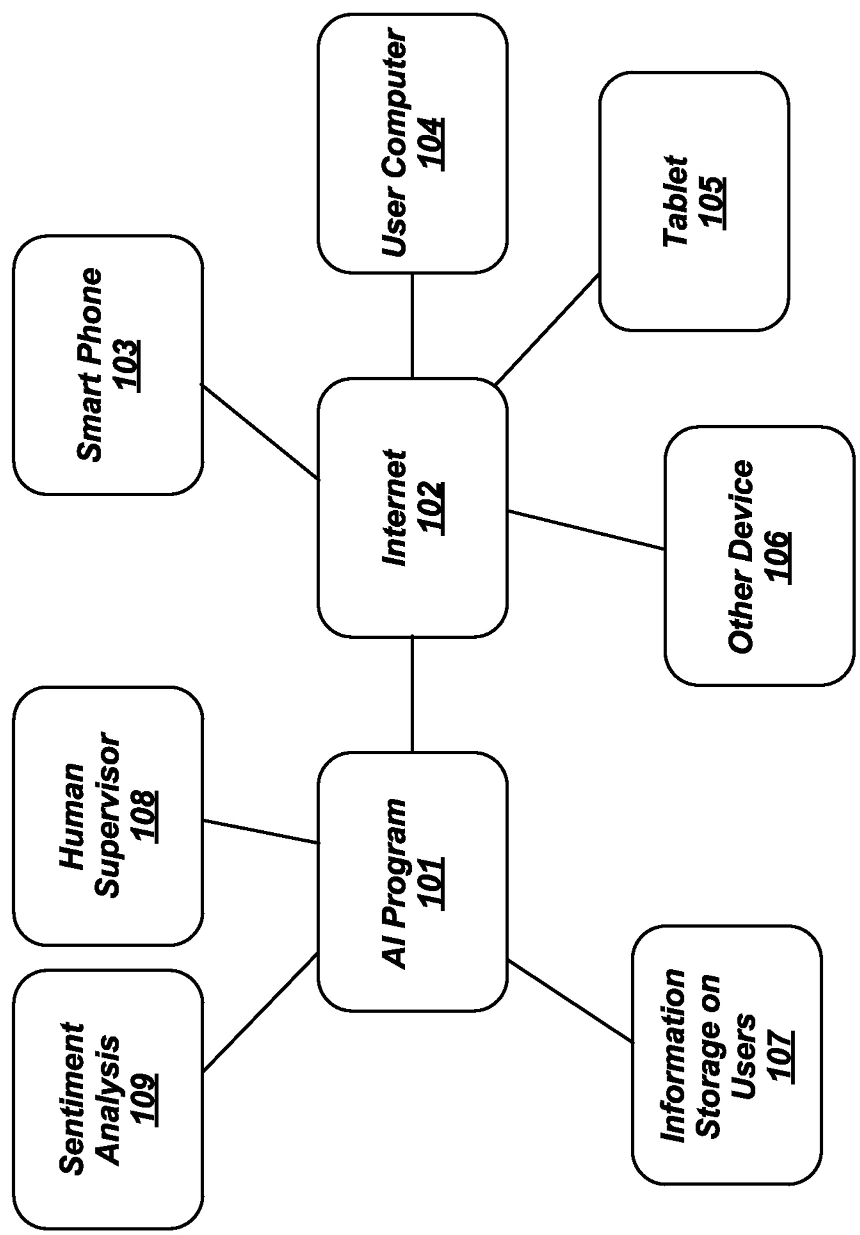
FIG. 1 is a chart showing the connections between different systems for conversational commerce to take place.

A system and method for creating an Artificial Intelligence for conversational commerce is provided. The system includes an AI trained using machine-learning algorithms, as known in the art, to develop a conversational strategy. FIG. 1 is a block diagram showing the system including the conversational artificial intelligence. The AI is trained using machine-learning algorithms and natural language processing. In initial stages, the machine is trained so that it may interact with human beings on a website as a salesperson or customer service representative might. The program may be stored in whatever medium is appropriate, though it is designed to be interacted with through the Internet 102. As such, the AI may comprise a device 101 containing a memory storage that contains the program. This device is connected to the Internet by any means known in the art. Thus any device that is connected to the Internet can access the AI, including, without limitation, a cellular telephone 103, a computer 104, a tablet 105, and other devices capable of accessing an internet connection 106. The AI also comprises on-site storage and memory 107 that allow the AI to learn and interact with each individual user. Therefore when a user accesses the AI, whether through a website, SMS, FACEBOOK, APPLE SIRI, or another means, it is capable of interacting with the user. The system also comprises means known in the art to store previous information that has been accessed and information about the user 107. This information may be identified to each unique user through appropriate means known in the art, such as the use of a login for a particular user, through storage of identifying information on a particular device, or through the use of any other means of identifying a user and storing the user's preferences. The AI is also programmed to learn and become more personalized to an individual user the more it interacts with that user. As an example, it may learn the user's styles, preferences, how the user prefers to interact, and other individual information that helps it better serve a user's needs.

Figure 2:
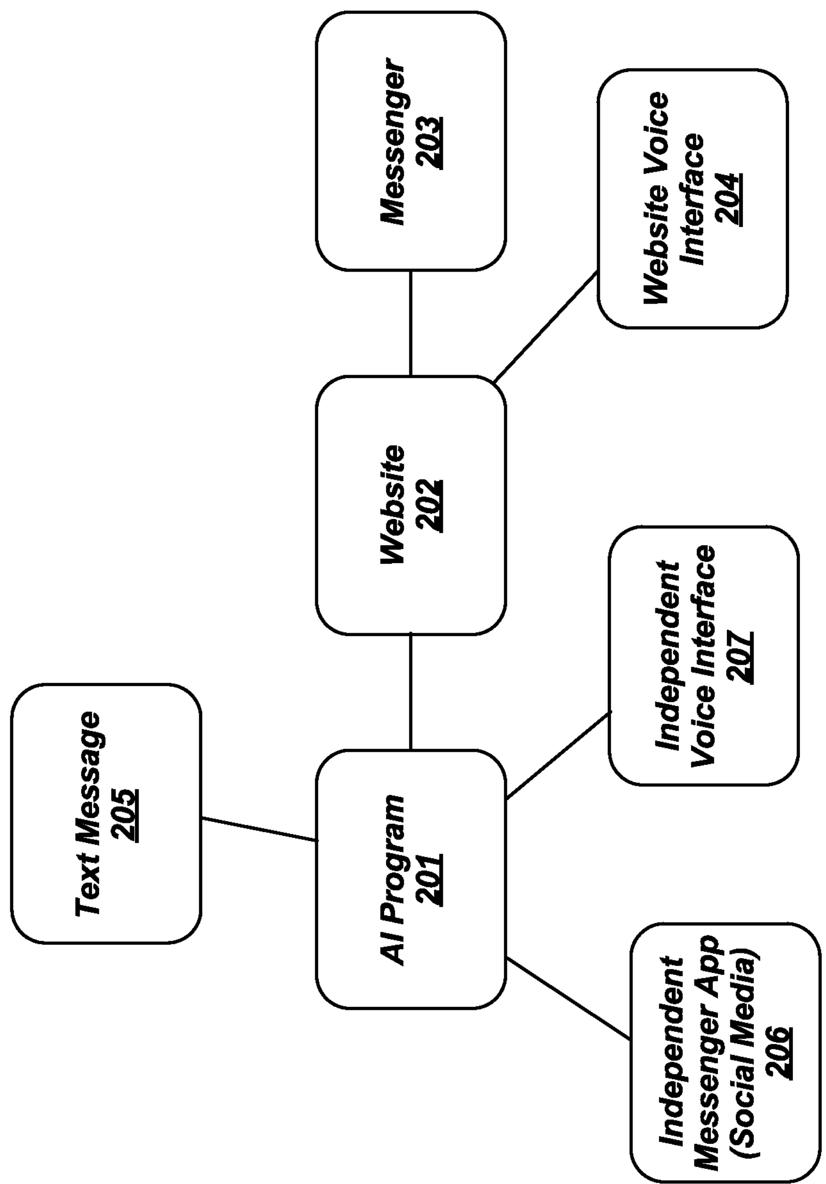
FIG. 2 is a chart showing methods by which the AI program can interact with a user.

The system also comprises an access device through which the user communicates with the AI. FIG. 2 shows the methods by which the AI program can interact with a user. The AI 201 interacts with the user through an omnichannel interface, which also comprises a means for the AI to recognize how the user is accessing it. As such the access device may comprise any type of device that has a connection to the server on which the AI is stored. A user can access the AI using a variety of devices and channels. For example, the user could access the artificial intelligence through the website of the company 202. This could be done through the messenger provided on the website to communicate with the AI 203. In addition, the user could communicate via text message 205, or via an independent messenger application to which the AI is available, such as FACEBOOK MESSENGER, or other social media 206. Another embodiment of the device comprises a voice interface, which can comprise both an original voice interface on the system's website 204, or a commercially available voice interface 207. The AI is configured to recognize the type of communication and respond accordingly and appropriately. For example, when asked a question via a voice interface application, the AI can recognize the type of communication and respond by providing information so that the voice interface application can provide the answer. The AI is trained to recognize the appropriate type of response by machine learning systems. As an example, when asked if a package had been shipped, the AI could respond with a voice communication that the package has been shipped and follow up with an email or text message communication showing the tracking number of the package and more detailed information. The AI uses natural language processing and machine learning to apply information and develop what type of response is most appropriate.

The system may employ human beings who can monitor the AI's interactions with individual customers and elect to take over the conversation from the AI if at some point there is a failure of the conversational AI 108 (FIG. 1). However, the system is designed such that the AI can use machine learning algorithms as known in the art to use the ways in which the human being responds to the needs of the customer to learn and incorporate those responses into the programming. As such, the AI may continue to incorporate better responses into its system.

The system may also incorporate a sentiment analysis capability 109 (FIG. 1) that uses sentiment analysis to evaluate the conversation and determine at what point a human being should step in. The system may also incorporate the sentiment analysis by using it to improve the conversation before making the choice to transfer the conversation to a human. For example, if the user expresses displeasure over the color of an item, it could use sentiment analysis to suggest better color options and, if that does not solve the issue, then a transfer to a human could be made.

In addition, the system can comprise an omnipresence technology, which requires a means to recognize what user is communicating with the AI from whatever platform the user might be using, as seen in FIG. 1, ref 107. As such, information about communications that have taken place are stored on a memory in a device that is accessible to all access devices a user might use. With the omnipresence system, when a user communicates with the system via email, that conversation will be stored and accessible to the AI to draw on for information when the user accesses the AI via text message or the messenger on the website. The information can also be accessible to the user of the device. For example, a user could have a communication via a text message at one point and later go onto the messenger interface online and receive the information through that interface simply by asking for the information previously given.

In one illustrative embodiment of the invention, the system also comprises a website stored in the memory of a server that can be accessed by the AI. The AI communicates with the website and displays the information a user requests and that is related to the conversation being had. At any point a user can access further information on the displayed items by clicking on them and following the links to the information on those items. However, the user can also interact with the site entirely through the AI, including checking order status and completing purchases. Current e-commerce websites involve interaction of a user with an electronic catalog, whereas the instant invention is built around a conversation, products, personalization, and checkout.

Figure 3:
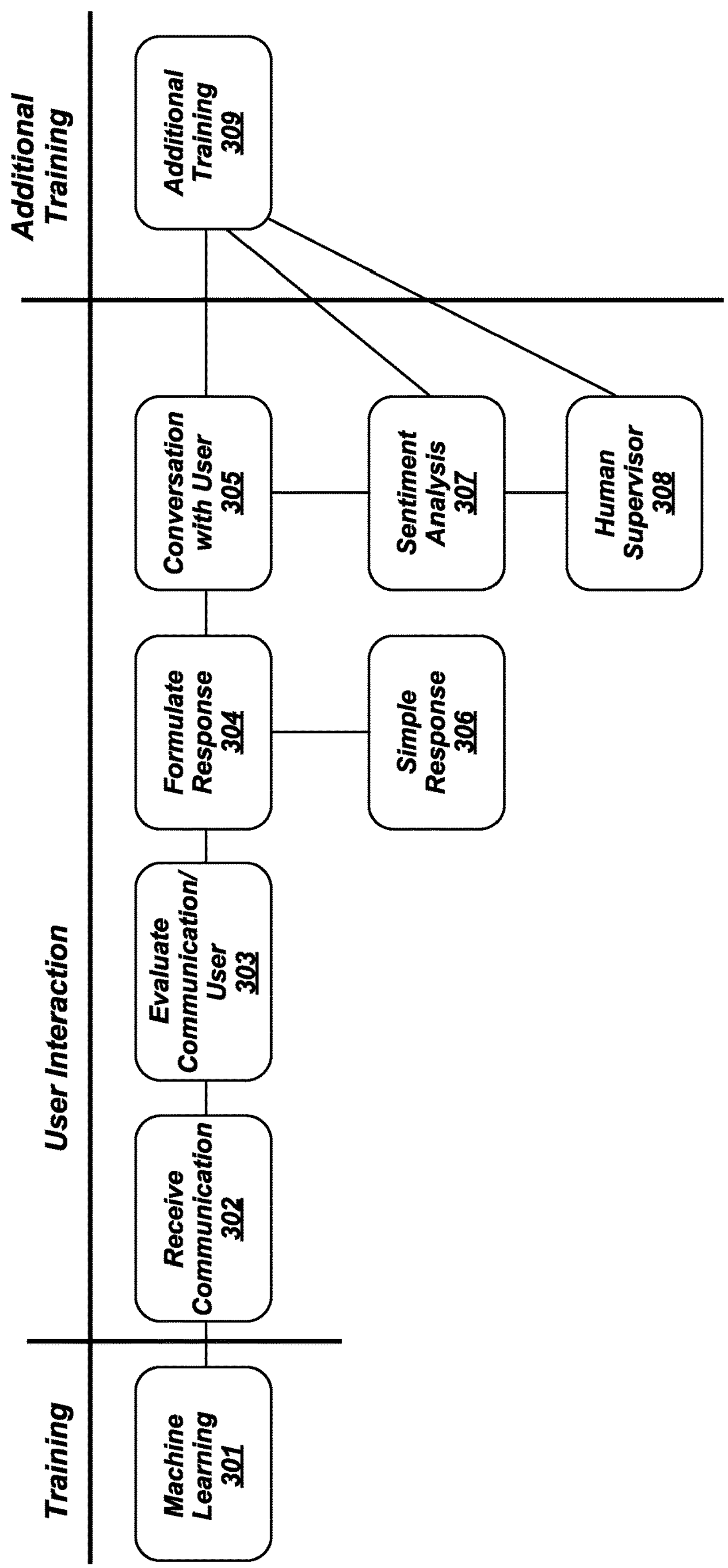
FIG. 3 is chart showing a method for configuring and training an artificial intelligence to work with a user for retail purchase.

In another illustrative embodiment, the AI can be configured to work with a user for retail purchases. FIG. 3 shows a method for configuring and training an artificial intelligence to work with a user for retail purchase. In step 301, the AI is trained using machine learning techniques to interact through conversations with a user. After training, the use and interaction occurs. At this stage, a communication is received 302. This communication may comprise a number of possible types of communications, as shown in FIG. 2. For example, a user may access the website and use the messenger/search application (app) to ask a question. A user might also send a text message, an email, send a message via a messenger app, use a voice enabled communication method, or use another method of communication that the AI has been connected to. After receiving a communication, the AI evaluates 303 the communication and the user, and based on the machine learning training, the data it has on the user, and the method of communication, formulates a response 304. This evaluation may include identifying the user. This identification can depend on the method used to communicate. For example, in a computer interaction, the user may be identified through logging in, while in a communication via email or text message, the user's known email or phone number may serve as the identification. Any method known in the art may be used to identify the user, and indeed, the method may vary with the method of communication. The AI then formulates an appropriate response. This appropriate response would be based on the machine learning of the AI and the type of request, and could include a simple response 306, but more often would include initiating a conversation with the user 305 based on the training of the particular AI and the information it has on a user. This conversation can include asking for further information to help the user complete a satisfying purchase, and can also be based on the previous interactions with the user. For example, if a user communicating through the website (whether by voice or messenger) expresses a desire for a pillow, the AI might ask "what kind of pillow?" Further questions could narrow down the search to something specific, such as a throw pillow with a plaid cover. However, if the AI had information that the user had purchased a couch from the same website the week before, it might start by asking, "Is this to go with the couch you purchased last week?" or simply by showing a variety of throw pillows. The conversational path may vary based on the conversational training received by the AI and the user's expressed preferences and desires. On the other hand, if a user simply requests to know when his/her package will ship, the AI may simply evaluate the identity of the user and state when the package has shipped. A response may include multiple means of communication, for example, in the case of a package, the AI may state the shipping date and offer to email further information, such as a link to track the shipment.

In addition, the method may comprise analyzing the conversation between the AI and the user with a sentiment analysis program 307 that analyzes how the user is feeling and determines when the user is not satisfied with the interaction with the system based upon the interactions taking place. The system allows for a human supervisor to take the place of the AI in the communication with the user and help the user with the tasks the AI could not do 308, or in a way the AI could not do. The system provides the supervisor with the complete history of the interaction, and records the human-to-human interaction for future machine learning training purposes.

During any interaction, the interaction can be recorded and used for additional machine learning training to further refine and improve on the AI's capabilities for conversational commerce 309. The AI may incorporate information from both the conversations it participates in, and from conversations that take place between the supervisor and the user because the AI could not complete the requests. During the human-to-human interaction, information regarding the communications between the supervisor and the user is saved and used in further levels of training for the AI 309, thus allowing the AI to incorporate information from conversations that it does not actively participate in. This information can be used to train the AI's responses in the future. In addition, information from successful interactions between the AI and the user can be incorporated into additional machine learning training for the AI.

In addition to the above points, the system may be built along a "plug-and-play" model, allowing other users to integrate with the AI. The system can be designed so that anyone can use it as a base for further development and it can become a base for additional platforms in the future. The system can also be designed so that it can be adopted to a single company's needs, forming the basis for a communication interface based on a number of topics.

An additional illustrative embodiment comprises a method for conducting conversational commerce online through a computerized, automated method. This system comprises training an AI through machine learning algorithms include natural language processing. The AI is programmed with this information and receives information about the website it is hosting. The user then communicates with the AI in a conversational style, much as a person would when purchasing an item at a standard physical store and communicating with the clerk. The AI can then respond by asking for additional information, and then directs the user to the information or products that the user desires. In one application of the method a supervisor can communicate with the user in place of the AI, such as when the AI is having difficulty with a particular interaction.

Another application of the method comprises the AI exercising machine-learning capabilities so as to develop its conversational abilities, helping a user feel more comfortable as the user can user natural language patterns to communicate.

Figure 4:
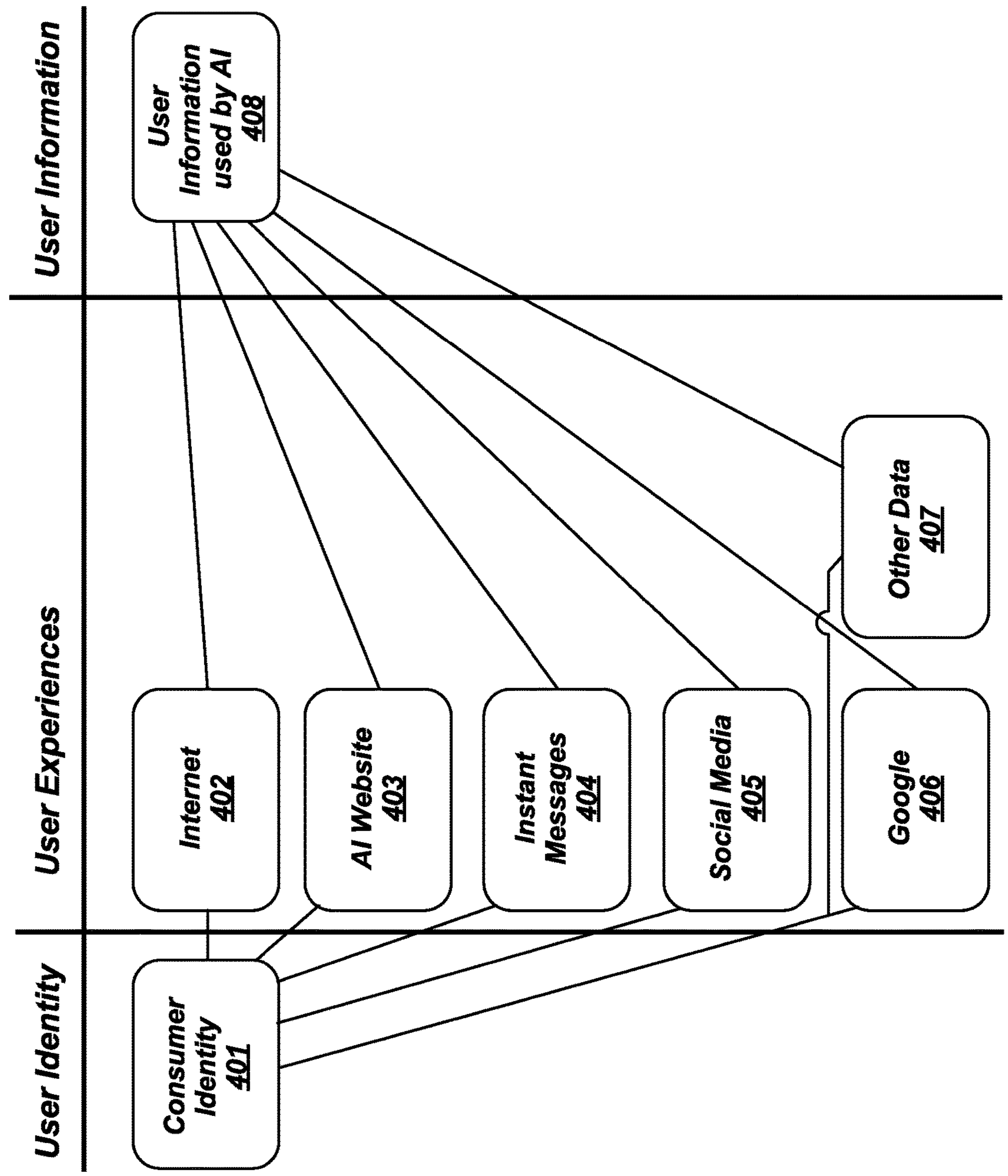
FIG. 4 is a chart showing sources of data for establishing a conversational commerce system with an artificial intelligence.

An additional embodiment of the system is shown in FIG. 4, demonstrating the sources of data collected for establishing a conversational commerce system with an artificial intelligence. A consumer's identity 401 is established using the consumer's experiences over the web. In this system, the information stored about a user (ref 107, FIG. 1) is collected from a variety of sources including the internet and cookies 402, the specific website to which the artificial intelligence is attached 403, instant messages 404, social media 405, GOOGLE and other search sites that collect data 406, and other data collection methods 407. These sources are included in the information about a user 408 and can be incorporated into the conversations initiated by the artificial intelligence while it is responding to a request. This information is used through computer operations that analyze the information, and the information is then used by the trained AI when interacting with a specific user.

What is claimed is:

1. A system for conducting conversational commerce online, comprising:

non-transitory computer memory having website program instructions stored within;

non-transitory computer memory having an artificial intelligence (AI) program stored within, wherein at least one machine learning algorithm is provided for training the artificial intelligence program in communication, personalization to particular users, and providing customer service, the artificial intelligence program having been trained using machine learning to communicate with users;

wherein the artificial intelligence program identifies each of the users upon receiving a communication and formulates an appropriate response based on the content of the request, the identity of each of the users, the information collected from each of the users' experiences over the web, the content of the communication, and the application of the results of the at least one machine learning algorithm;

a server connected to the Internet, wherein the server contains programming directing the system to use the artificial intelligence program for interactions with the users;

wherein the server contains programming directing the system to identify the users and store information collected from the users' experiences over the web, wherein said information is collected from sources including at least one of: cookies, information from users' profiles on the website, instant messages, social media, search engines that collect data, and other available data collection methods;

wherein the server applies the at least one machine learning algorithm to do at least one of the following: improve the artificial intelligence program's communication, personalize the artificial intelligence program's response to each of the users, and improve the artificial intelligence program's responses to users' requests; and one or more access devices, each device comprising a user interface to access the artificial intelligence program, wherein the artificial intelligence program interacts with users.

2. The system of claim 1 further comprising a second interface; the second interface configured for a human supervisor to communicate with the system, allowing the human supervisor to take over communication with the users from the computer.

3. The system of claim 1 wherein the website program instructions are configured for the purchase of goods and the artificial intelligence program (AI) aids the users in making purchases.

4. The system of claim 1 wherein the one or more access devices comprise a personal computer.

5. The system of claim 1 wherein the one or more access devices comprise a cellular telephone.

6. The system of claim 1 wherein the artificial intelligence program communicates with users through text message.

7. The system of claim 1 wherein the one or more access devices comprise a vocal communication device to communicate with the users through vocal contact.

8. The system of claim 1 wherein the artificial intelligence program communicates with the users via a messenger application on a computer.

9. The system of claim 1 wherein the artificial intelligence program comprises instructions to introduce additional information to the users, wherein said information comprises information about products, requests for additional information, or other information based on information stored about the users.

10. A method for conducting conversational commerce online using an artificial intelligence, the method comprising:

training the artificial intelligence to interact with a user through conversation by using machine learning;

connecting the artificial intelligence to a website to use for conversational commerce while the artificial intelligence can access all information about the website for customer assistance;

connecting the artificial intelligence to an access device through the Internet, allowing the user to interact with the artificial intelligence;

training the artificial intelligence to identify the user of the website;

storing information collected from a variety of sources on the user's experiences over the web, wherein said information includes at least one of: information from cookies, information from a user profile on the website, instant messages, social media, search engines that collect data, and other available data collection methods;

training the artificial intelligence to formulate an appropriate response to the user's request based on the content of the request, the user's identity, the information collected from the user's experiences over the web, the content of the communication, and the application of the results of at least one machine learning algorithm;

applying at least one machine learning algorithm to do at least one of the following: improve the artificial intelligence program's communication, personalize the artificial intelligence program's response to the user, and improve the artificial intelligence program's responses to the user's requests.

11. The method of claim 10 also comprising enabling the artificial intelligence program to communicate with the user through one or more methods comprising email, voice communication, text-based communication through computer chat, and text messaging by phone.

12. The method of claim 10 also comprising collecting data from any conversation of the artificial intelligence with the user and using these data to continually train the artificial intelligence using machine learning strategies.

13. The method of claim 12 also comprising a human supervisor monitoring an interaction between the artificial intelligence and the user and entering the conversation with the user.

14. The method of claim 10 also comprising enabling the artificial intelligence to recognize the user and adapt interactions to the user.

15. The method of claim 14 wherein the artificial intelligence recognizes the user through the user's username and password communicated to the website from the access device.

16. The method of claim 14 wherein the artificial intelligence recognizes the user through identifying biometric information collected by the access device and communicated to the website.

17. The method of claim 14 wherein the artificial intelligence recognizes the user through identification of the access device the user is using to communicate.

18. The method of claim 17 wherein the access device is a smartphone.

* * * * *